(12) United States Patent
Short

(10) Patent No.: US 7,217,164 B2
(45) Date of Patent: May 15, 2007

(54) VISUAL SPORTS TRAINING APPARATUS AND METHOD

(76) Inventor: Andrew Liam Brendan Short, 47 Duke Street, Richmond, Victoria (AU) 3121

( * ) Notice: Subject to any disclaimer, the term of this patent is extended or adjusted under 35 U.S.C. 154(b) by 0 days.

(21) Appl. No.: 11/444,906

(22) Filed: Jun. 1, 2006

(65) Prior Publication Data

US 2007/0032143 A1 Feb. 8, 2007

(51) Int. Cl.
*B60L 1/14* (2006.01)
(52) U.S. Cl. .......................................... 440/2; 440/105
(58) Field of Classification Search ................ 440/2, 440/105
See application file for complete search history.

(56) References Cited

U.S. PATENT DOCUMENTS

| 4,984,986 | A | * | 1/1991 | Vohnout | 434/247 |
| 5,834,676 | A | * | 11/1998 | Elliott | 89/41.05 |
| 6,456,261 | B1 | * | 9/2002 | Zhang | 345/8 |
| 2005/0085348 | A1 | * | 4/2005 | Kiefer et al. | 482/72 |
| 2005/0170711 | A1 | * | 8/2005 | Spencer et al. | 440/21 |

* cited by examiner

*Primary Examiner*—Stephen Avila
(74) *Attorney, Agent, or Firm*—Richard M. Goldberg

(57) ABSTRACT

A real time visual self-monitoring system for a user includes a camera adapted for fixed monitoring in selectable relativity to the user, a monitoring device for receiving camera output adapted for viewing by the user and a power supply for the camera and monitoring device as required in which the monitoring device allows the user to selectively and/or simultaneously view their own real time motion from a remote vantage point in conjunction with their own peripheral vision.

9 Claims, 4 Drawing Sheets

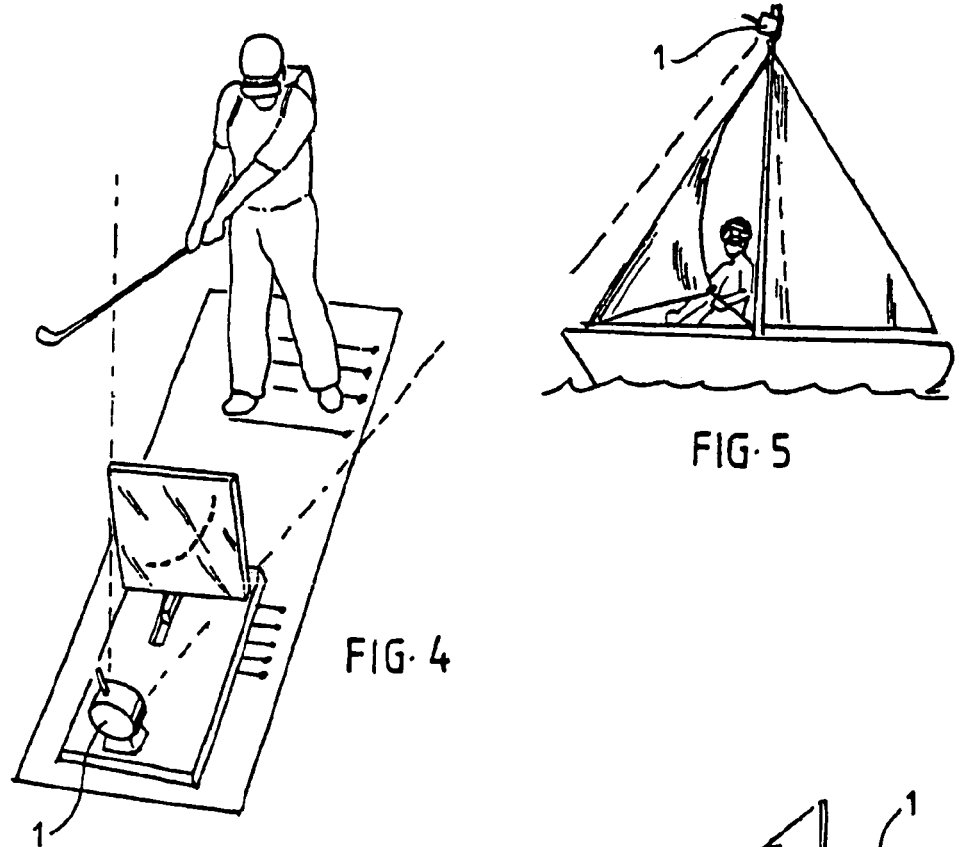
FIG. 5
FIG. 4
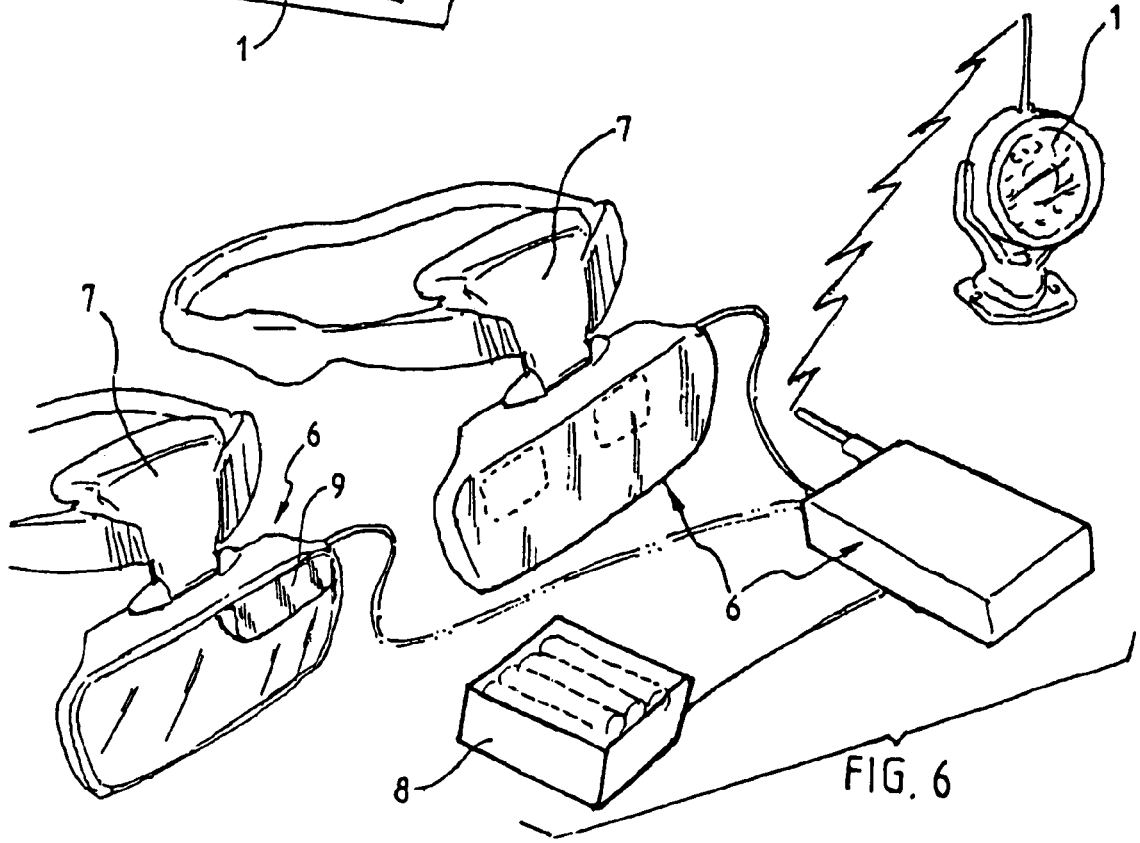
FIG. 6

VISUAL SPORTS TRAINING APPARATUS AND METHOD

CROSS-REFERENCE TO RELATED APPLICATIONS

The present application claims priority from Australian Provisional Patent Application No 2005904163 filed on 3 Aug. 2005, the content of which is incorporated herein by reference.

INTRODUCTION TO THE INVENTION

This invention relates to the visual monitoring of a persons physical activity and in particular to an improved system and method of achieving real time constant visual self monitoring of a user's physical actions. The invention finds particular application for athletic users.

BACKGROUND TO THE INVENTION

The ability to visually monitor or record an athletes action during execution of their sport is an important part of the learning process which allows the athlete to see themselves in action and thereby witness and compare their own movements and performance against other athletes and their own perceptions.

The use of video cameras to record athletes in motion is of course well known and part of our everyday lives. However, the use of video monitoring in a manner to allow the subject direct and real time access to their performance is not overly advanced.

For example, it is known to make a recording of an athletes performance and then have the athlete sit down and watch the recording of themselves. However, this involves obvious time delays and requires the use of a cameraman to record the athlete and relies on the users memory of the circumstances present during the active part of the recording. All these limitations greatly reduce the learning function of such a system and method as a result of this feedback loop duration. Moreover, numerous additional obstacles impede the satisfactory use of current systems.

For example, a boat rower requiring a video recording and playback session will need the following equipment and resources:

Dead calm weather and good light

A TV set and suitable connection cables in the boathouse or nearby where the footage can be seen and discussed with the crew.

A speed boat available in working order to accompany the crew that has enough petrol A driver for the boat A video camera, charged up with a blank tape A second person is required to get really good footage as the driver must focus on avoiding collisions A wide and/or quiet stretch of river where a speedboat is allowed.

In addition, in many cases speed boats are banned from the stretches of water where rowing is very common as the wash generated by the motor boats can disrupt rowing crews.

Even with all these factors resolved, the problem of feedback duration will limit the value of the session results. It takes a while before the outing on the waterway is completed, footage is collected and the rowers are sat down in front of the TV to view it. On top of this duration, there is at least 15 minutes to half an hour before the rowers can be back out on the water to begin to make any technical changes in light of what they have seen, heard and discussed during the video session. This loop is at least one hour, and often it is the next session on a following day when the rowers take to the water again.

In order to address these short comings, one system known as the AIS (Australia Institute of Sport) system has been developed which provides a live video feedback to rowers in real time as they travel along a waterway.

However, the AIS system still requires an external photographer to take the video footage of the rower.

There are a number of aspects of the AIS system that are problematic. The system cannot be used on waterways where motorboats are banned, and requires a number of trained personnel for operation. There is no capacity for peripheral vision. The system does not produce standardised views of the rowers from a fixed camera. The system is not readily usable by typical rower. Finally, the AIS system is not readily applicable to other sports.

Some problems with prior art systems are discussed in more detail as follows:

Not Useable on all Waterways

There are many waterways in Victoria where speedboats are banned and it is relatively common that speedboats are prohibited in areas where there are many rowing boats (e.g. the Yarra river along the rowing course in Melbourne and the ISIS at Oxford, the Cam at Cambridge).

The requirements for two persons, in addition to the rowers, preclude usage for a number of reasons. Rowers are up very early and it is difficult to get a coach, let alone a second person to hold a camera. For the coach to undertake driving and filming simultaneously leads to poor quality footage and can cause collisions. For these reasons, even standard video capture is used only sparingly as a training tool.

No Peripheral Vision

The AIS system takes the form of a mask where the rowers can only see the small TV screens and other vision is blocked out by a mask. Peripheral vision blocked in this manner may perturb the athletes proprioception and could lead to motion sickness.

It is well known that if travelers can see out at the horizon, they are less likely to experience motion sickness. It seems that where a person is in motion, they need to get visual feedback from their environment that makes sense of it. Consequently, the lack of peripheral vision in the AIS system may lead to motion sickness.

Although rowers would see themselves in the TV screens in the AIS system mask, the mask blocks how they would normally see their arms and feet in their peripheral vision.

Proprioception is the self knowledge of the position of our limbs and body. The peripheral vision we have of our own body parts provides sensory input to the brain. It is in the mind that all the sensory input is put together and our perception of the position of body parts is established. Without the visual cue of peripheral vision the learning may not be as effective in improving technique.

For example, rowers can see where their hands are (or appear to be) using their normal sight and can then gauge that in relation to where they actually are presented on the TV screens.

It is clear that without visual sensory input athletes often move differently, this might not be ideal for learning. A well known training exercise in rowing, is to close the eyes where rowers then have to listen and pick up the feel of the boat without any vision input. The rowers invariably row differently; sometimes the cohesion of the rowers improves and sometimes technique deteriorates, depending on the extent to which individuals rely on vision input.

No Standardised Shots

Biometrics is commonly used in a number of sports. In such cases, a fixed camera is required for the footage to be readily analysed. The unpredictable relative movement of the camera in the accompanying speedboat and the athletes in a rowing boat means that biomechanists would find it extraordinarily difficult to extract useful parameter values from the footage. Consequently biometrics is not commonly used in rowing.

For athletes to monitor their progress over time, a standardised series of shots is required. Without a steady shot at each of two time points this is very difficult. Collection of suitable footage is dependent on the weather and camera skills. In addition, if rowers are to be compared remotely or relative to some standard then again a series of standard shots would be required.

Not Useable by a Typical Rower

In its present form, the AIS system needs the attention of trained personnel. Trained personnel are rarely available in elite centres well equipped; let alone at the facilities generally available to rowing clubs. In addition, rowers need to use the system for a number of sessions to get the best out of it. Initial trials benefit the rower in terms of realisation and during additional sessions they can cover a number of aspects of their technique and make and monitor their efforts at changing.

Not Readily Applicable in Other Sports

Application of the AIS system to golf is hampered by the fact that the golf ball is not directly visible. Without peripheral vision, many athletes would have balance problems, possibly leading to injury. Lack of peripheral vision in weight lifting could lead to serious injury, due to over balancing or interruption of routine technique. The system may be of little use in martial arts as the correlation of the limb position in the vision goggles and that visible in peripheral vision is a key learning mechanism.

One object of the current invention is to provide an improved system and method allowing real time self monitoring of physical movement and performance by a user.

Statements of the Invention

In a first aspect the invention provides a real time visual self-monitoring system for a user, said system comprising a camera adapted for fixed monitoring in selectable relativity to said user, a monitoring means for receiving camera output adapted for viewing by said user and a power supply for said camera and monitoring means as required wherein said monitoring means allows said user to selectively and/or simultaneously view their own real time motion from a remote vantage point in conjunction with their own peripheral vision.

The monitoring means may be a video screen mounted in a head piece adapted for wearing by said user.

The camera and goggles preferably communicate by wireless means. The goggles may allow the user to selectively view the real time image and/or the users peripheral environment by eye movement alone. The goggles may be single or dual eye and may be adapted for mounting to the user's head by way of a mounting cap. The mounting cap may include said power supply.

The camera may be mounted relative to the user on a piece of equipment being used including a boat for a rower, bicycle for a cyclist etc.

The camera may be fixed relative to the user or adapted for movement to suit the user. The system of the invention may include mounting means for fixing the camera to a piece of equipment being used by the user. The camera may include protective elements including water-proofing, shock proofing etc.

The system may include data collecting means for recording and analysing the users movements and actions. The data may include a standardised series of visual images or measurements.

DETAILED DESCRIPTION OF THE INVENTION

The invention will now be described with reference to one particularly preferred embodiment with the invention being generally applied to the sport of rowing as shown in the accompanying figures as follows:

FIG. 4 shows the system applied to the sport of golf.

FIG. 5 shows the system used to provide remote visual access for a user.

FIG. 6 shows the components of the system.

Referring firstly to the schematic representation shown in FIG. 1, the invention provides a system and apparatus whereby a user, in this case, the rower is able to access real time video monitoring and images of their own movements as they row during the actual execution of this activity.

Figure 1A:
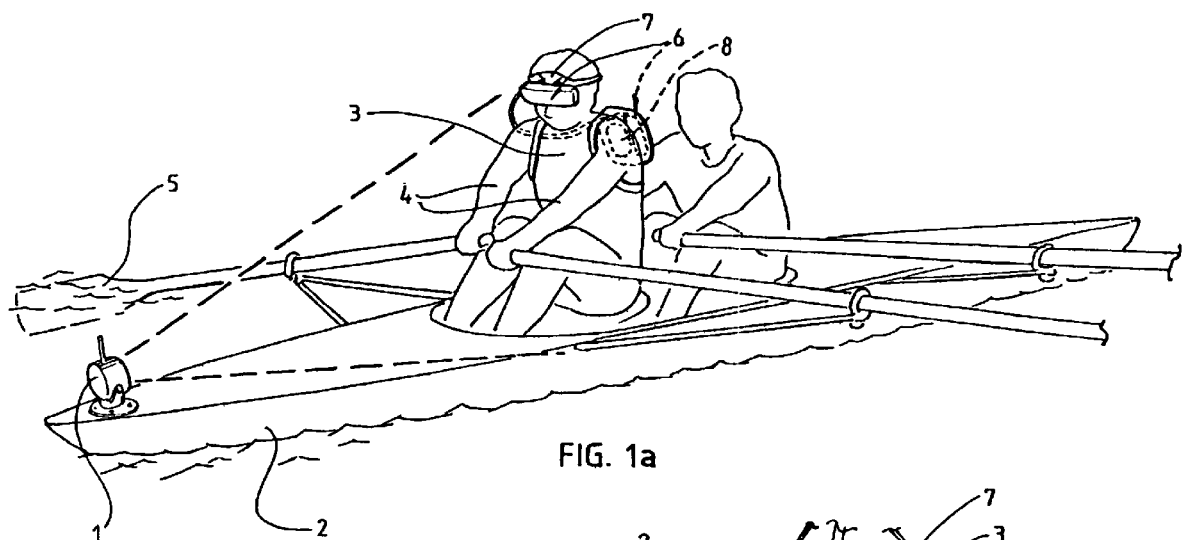
FIG. 1 shows a perspective and top view of a row boat equipped with the system of the invention.
Figure 1B:
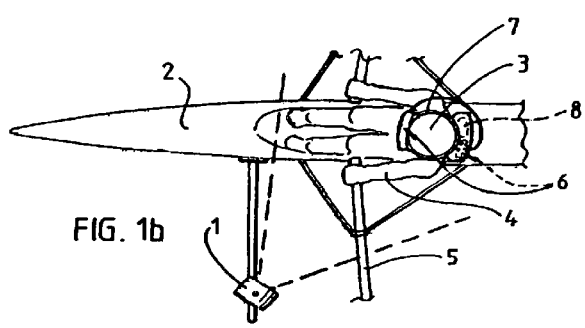
Figure 2A:
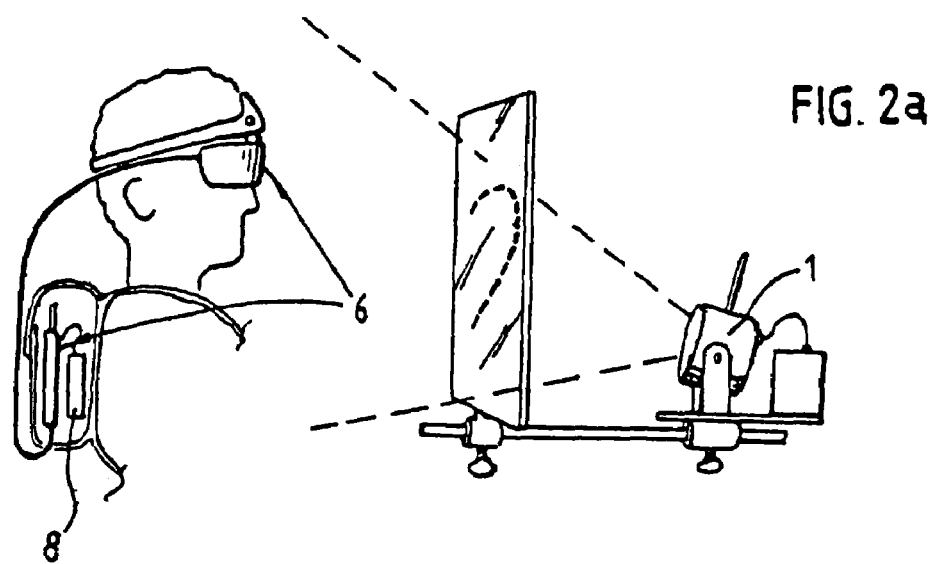
FIG. 2 shows the system used in a non sport application for video mixing.
Figure 2B:
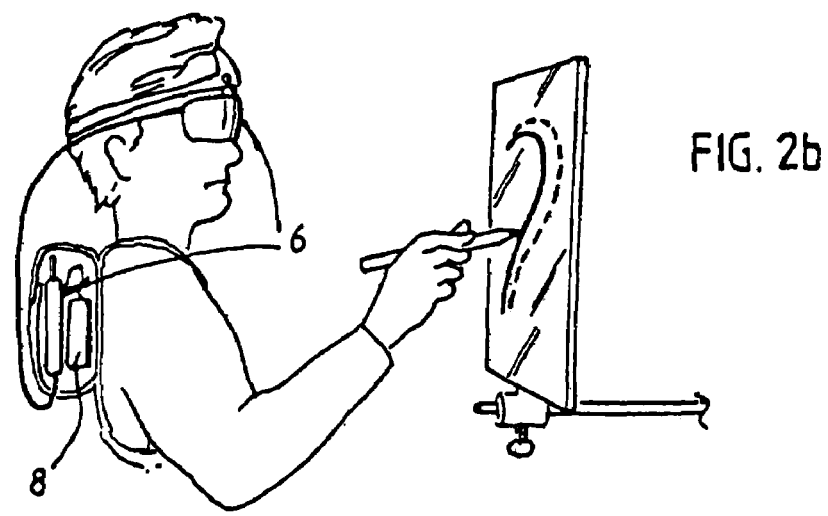
Figure 2C:
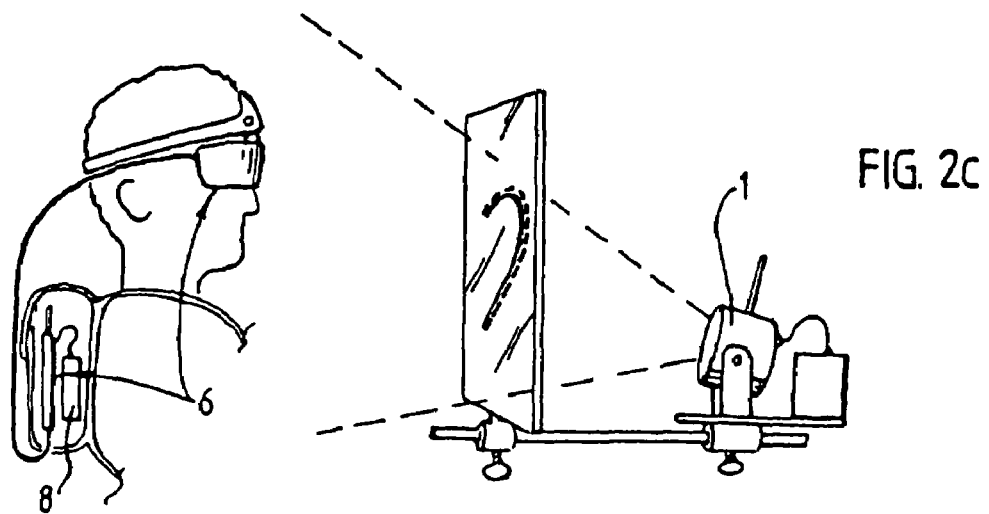

The system of the invention comprises a camera 1 which is fixed to any part of the rower's boat 2 but is most appropriately fixed and adjusted to provide images from the front of the rower 3, whilst also including the peripheral aspects and environment of the rower including their arms 4, oars 5 and the immediate physical environment including seating position etc., within the boat. The camera can be adjusted in accordance with the users requirements and may be moved forward or aft in order to provide the most desirable relativity to the user for the purposes of monitoring required by the user. For example, the camera could be mounted on the bow of the boat as shown in FIG. 1a, or in any position where the user requires monitoring of their actions, for example on an outrigger shown in FIG. 1b. In this manner, the camera is adaptable for fixed monitoring in selectable relativity to the user in accordance with the particular requirements of the user, the sport or the particular activity being monitored. The camera produces visual output which is monitored via a monitoring means 6. The monitoring means can be a pair of goggles mounted to a suitable cap or helmet 7 such that the goggles are automatically positioned or positionable within ready visual access by the rower. The monitoring means can be adapted for receiving the camera output by wireless transmission and both the camera and monitoring means may be provided with an independent or a common power supply 8 in the form of a suitable battery pack. The monitoring means may be incorporated into the goggles or helmet; or may include a separate transmitter associated with the power supply as shown in FIGS. 1 and 3 where the transmitter and power supply are fitted to the rowers shoulder pack.

Figure 3:
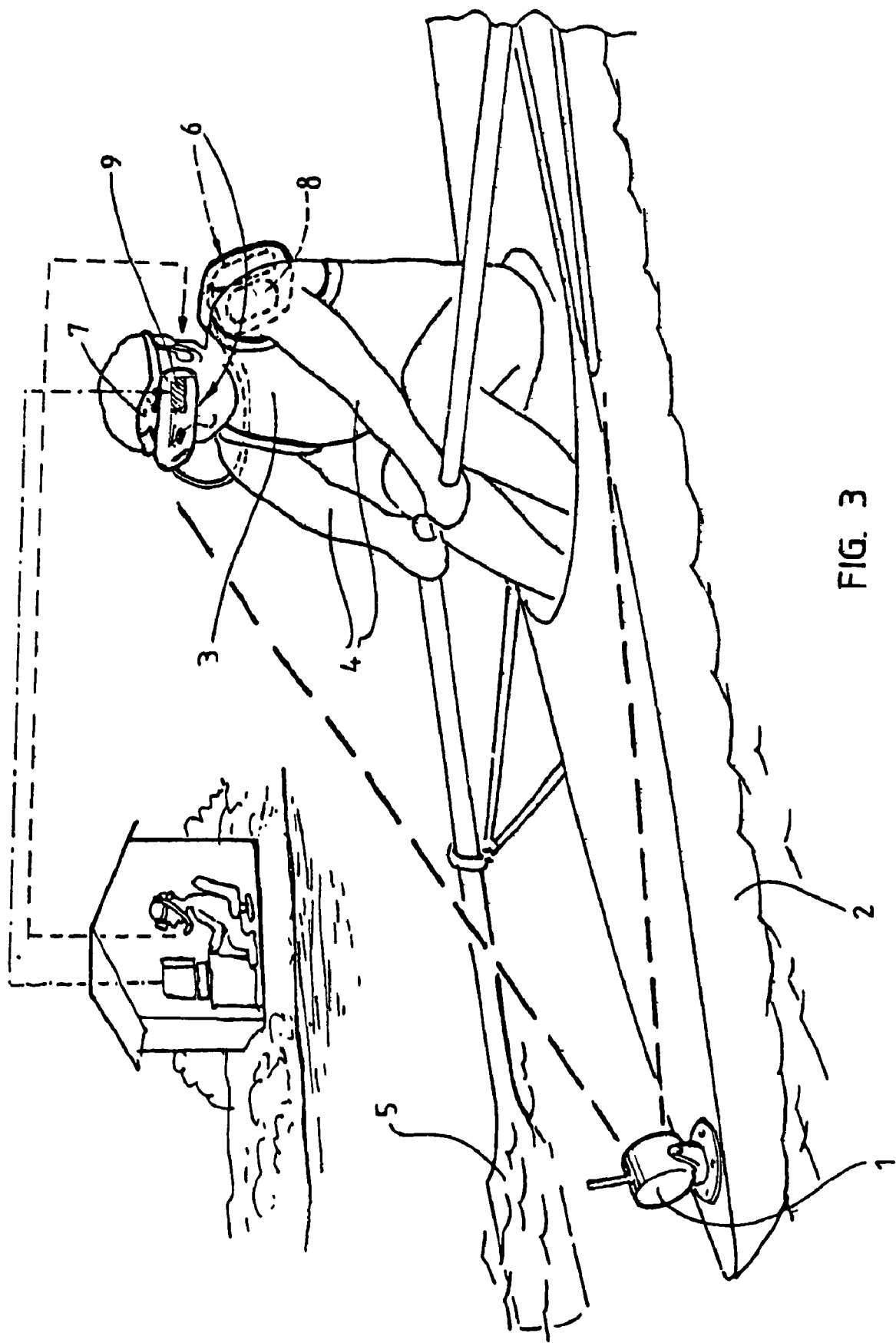
FIG. 3 shows a row boat where the rower is monitored and coached by an observer.

Referring now to FIG. 3, the goggles or helmet 7 are preferably provided with an output screen 9 within the field of vision of the rower 3 in a manner allowing the rower to monitor the output whilst also allowing the rower to simultaneously perceive their movements. This can be achieved by a suitable sized screen output for positioning within the vicinity of the field of vision of the user, but of sufficient size so as not to totally or even substantially preclude the peripheral vision from the user. In this manner the visual output of the monitoring means is available for constant or on demand viewing by the user as they go about their normal rowing exercises with minimal interference, or even minimal awareness of the monitoring system of the invention except for the times when the self monitoring facilities of the invention are available for the rower to quickly review the motion or physical action from a remote location being the mounting point of the camera.

Whilst the system of the invention will in most cases use a fixed camera mounted on the bow of the boat, the invention provides for the movement and repositioning of the camera as required. In particular, the system of the invention provides for the camera to be mounted at any convenient position on the boat or when used for other sporting and activities requiring monitoring, the camera can be mounted at a suitable position with respect to the users equipment.

The camera and monitoring means are provided with suitable water-proofing and robust construction commensurate with the environment in which they will be used. In addition, the power supply and radio transmission are similarly robust and can be adapted for the particular environment and activity being undertaken. The camera output may be adapted for monitoring by a third person and/or recordal for data collection and monitoring or coaching purposes, and in this manner the activities of a rower can be made available for real time visual self monitoring by the rower themselves, and also simultaneously viewed by a coach who can provide feedback having in mind their visual assessment of the rower in conjunction with the information made available to the rower by the system of the invention. The camera output can also be recorded for later analysis and also provide detailed data on the movements and actions of the rower, particularly as the camera will in most cases be fixed and provide important quantative data on the relative movements of the rower which can then be used for detailed analysis.

FIG. 3 shows the system used by a lone rower where the actions of the rower and output screen 9 available to the rower are monitored by a coach or trainer located on shore. The coach may have a radio communicator with the rower and provide instant feedback and coaching to the rower.

FIG. 6 shows the component details of the system where the camera provides video output received wirelessly by a transmitter forming part of the monitoring means 6 in conjunction with a set of goggles. The goggles include either single or double visual output screens 9.

The system of the invention provides for the first time a highly flexible and versatile system allowing a user access to real time visual self monitoring of their movements or actions in a wide range of environments including sporting, artistic, recreational and professional activities. The system of the invention can be used by a single rower without the need for any auxiliary equipment, trained personnel and substantial back-up as is required in many of the prior art systems.

The system of the invention has been described with particular reference to the sporting activity of rowing, but finds ready application in a wide range of other endeavours, and is not limited to any one particular application.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A real time visual self-monitoring system for a user, said system comprising:
   a camera adapted for fixed monitoring in selectable relativity to the user,
   a monitoring device for receiving an output from said camera which is adapted for viewing on said monitoring device by the user, said monitoring device including a video viewing screen mounted in a headpiece adapted for wearing on a head of the user and positioned within a field of vision of the user so as to allow the user to selectively view at least one of a real time image and a peripheral environment of the user by eye movement alone, and
   a power supply for said camera and monitoring device,
   wherein said monitoring device allows said user to at least one of selectively and simultaneously view real time motion of the user from a remote vantage point in conjunction with peripheral vision of the user.

2. A system according to claim 1, wherein said camera and said monitoring device communicate by a wireless arrangement.

3. A system according to claim 1, wherein said monitoring device includes one of the following:
   a single viewing screen, and
   a dual viewing screen.

4. A system according to claim 3, wherein said headpiece includes a helmet for wearing on the user's head.

5. A system according to claim 4, wherein said power supply is provided within said helmet.

6. A system according to claim 1, wherein said camera is mounted relative to the user by fitting to a piece of equipment being used by said user.

7. A system according to claim 6, wherein said piece of equipment includes a rowing boat and said camera is mounted on a stern of the boat.

8. A system according to claim 1, further including a data collecting device for recording and analyzing movements and actions of the user.

9. A system according to claim 8, wherein said data collecting device includes a standardized series of visual images and measurements.

* * * * *